US012052545B2

(12) United States Patent
Austad et al.

(10) Patent No.: US 12,052,545 B2
(45) Date of Patent: Jul. 30, 2024

(54) HEARING AID SYSTEM INTEGRABLE IN AN EYEGLASS FRAME

(71) Applicant: TK&H Holding AS, Tjøme (NO)

(72) Inventors: Tom Austad, Tjøme (NO); Hans Zwart, Apeldoorn (NL)

(73) Assignee: TK&H Holding AS, Tjøme (NO)

( * ) Notice: Subject to any disclaimer, the term of this patent is extended or adjusted under 35 U.S.C. 154(b) by 160 days.

(21) Appl. No.: 17/798,790

(22) PCT Filed: Feb. 16, 2021

(86) PCT No.: PCT/EP2021/053731
§ 371 (c)(1),
(2) Date: Aug. 10, 2022

(87) PCT Pub. No.: WO2021/165238
PCT Pub. Date: Aug. 26, 2021

(65) Prior Publication Data
US 2023/0108217 A1    Apr. 6, 2023

(30) Foreign Application Priority Data

Feb. 17, 2020  (NO) .................................. 20200205
Aug. 5, 2020   (NO) .................................. 20200878

(51) Int. Cl.
H04R 25/00       (2006.01)
G02C 11/06       (2006.01)
(Continued)

(52) U.S. Cl.
CPC .......... *H04R 25/407* (2013.01); *G02C 11/06* (2013.01); *G06F 3/012* (2013.01); *G06F 3/0346* (2013.01); *G06T 7/50* (2017.01); *G06V 40/161* (2022.01); *G06V 40/172* (2022.01); *G06V 40/18* (2022.01); *H04R 25/505* (2013.01); *H04R 25/60* (2013.01);
(Continued)

(58) Field of Classification Search
None
See application file for complete search history.

(56) References Cited

U.S. PATENT DOCUMENTS 6,690,807 B1   2/2004   Meyer
8,177,361 B2   5/2012   Sessner
(Continued)

FOREIGN PATENT DOCUMENTS

CA      2559844      10/2005
CN      107402677    11/2017
(Continued)

OTHER PUBLICATIONS

PCT Search Report and Written Opinion mailed in corresponding PCT/EP2021/053731 on May 6, 2021 (15 pages).
(Continued)

*Primary Examiner* — Kenny H Truong
(74) *Attorney, Agent, or Firm* — Wissing Miller LLP

(57) ABSTRACT

The present disclosure is related to an eyeglass frame system comprising at least two microphones in wireless communication with adapted air buds. The hearing aid system is configured with a video camera in communication with a face contour detection process that together with an audio processing system is performing beam forming of respective microphones thereby improving reception of audio sound from the direction of identified face contours.

21 Claims, 15 Drawing Sheets

(51) Int. Cl.
  *G06F 3/01* (2006.01)
  *G06F 3/0346* (2013.01)
  *G06F 3/0354* (2013.01)
  *G06T 7/50* (2017.01)
  *G06V 40/16* (2022.01)
  *G06V 40/18* (2022.01)

(52) U.S. Cl.
  CPC .............................. *G06F 3/03547* (2013.01); *G06T 2207/30201* (2013.01)

(56) References Cited

U.S. PATENT DOCUMENTS

| | | |
|---|---|---|
| 8,854,452 B1 | 10/2014 | Raffle |
| 9,104,242 B2 | 8/2015 | Xiong |
| 10,347,246 B2 | 7/2019 | Lee |
| 2010/0231546 A1 | 9/2010 | Digon |
| 2013/0278631 A1 | 10/2013 | Border |
| 2014/0181750 A1 | 6/2014 | Fujiwara |
| 2015/0088500 A1 | 3/2015 | Conliffe |
| 2015/0160120 A1 | 6/2015 | Sanchez |
| 2016/0277850 A1 | 9/2016 | Li |
| 2016/0364025 A1 | 12/2016 | Bernstein |
| 2017/0255327 A1 | 9/2017 | Simmons |
| 2019/0174237 A1 | 6/2019 | Lunner |
| 2019/0391391 A1 | 12/2019 | Pazmino |
| 2020/0012110 A1 | 1/2020 | Blum |
| 2020/0019367 A1 | 1/2020 | Sun |

FOREIGN PATENT DOCUMENTS

| | | |
|---|---|---|
| EP | 2214087 | 1/2009 |
| EP | 3267697 | 4/2017 |
| EP | 3496417 | 6/2019 |
| JP | 6514599 | 5/2019 |
| KR | 20130038785 | 4/2013 |
| WO | 2004028203 | 4/2004 |
| WO | 20160131064 | 8/2016 |
| WO | 2016148875 | 9/2016 |

OTHER PUBLICATIONS

Office Action mailed in Priority Norwegian Application 20200878 on Aug. 14, 2021 (5 pages).
Office Action mailed in Priority Norwegian Application 20200205 on Jun. 5, 2020 (6 pages).
Search Report mailed in Priority Norwegian Application 20200205 on Jun. 5, 2020 (2 pages).
Maxus Tech, MW0582TR11 Datasheet (https://www.seeedstudio.com/MW0581TR11-5-8GHZ-Microwave-Doppler-Radar-Motion-Sensor-p-4366.html?queryID=927018405e151e437870a6d538ee7eb0&objectID=4366&indexName=bazaar_retailer_products), Nov. 2019 (3pgs).
Omron Corp, B5T-007001 Product Sheet, 2016-2019 (13pgs).
Kickstarter brochure, "The Worlds Smallest Wireless Earbuds", https://www.kickstarter.com/projects/earin/earin-the-worlds-smallest-wireless-earbuds#:~:text=Earin%20is%20the%20smallest,%20wireless,delivering%20high%20quality%20audio%20sound.
TDK, Product Sheet for ICS-41351 (https://invensense.tdk.com/products/digital/ics-41351/), May 20, 2020 (23 pgs).
Analog Devices, Product Sheet for ADAU1787 (https://www.analog.com/en/products/adau1787.html#product-overview), 2019-2020 (280 pgs).
PCT International Preliminary Report on Patentability mailed in corresponding PCT/EP2021/053731 on Aug. 23, 2022 (9 pgs).
PixArt Imaging Inc., PAJ7620U2 Data Sheet, Mar. 29, 2016 (28 pgs).

A

B

C

D

E

F

HEARING AID SYSTEM INTEGRABLE IN AN EYEGLASS FRAME

CROSS-REFERENCE TO RELATED APPLICATIONS

This application is a 371 of PCT/EP2021/053731 filed on Feb. 16, 2021, published on Aug. 26, 2021 under publication number WO 2021/165238, which claims priority benefits from Norwegian Patent Application No. 20200205 filed Feb. 17, 2020 and Norwegian Patent Application No. 20200878 filed Aug. 5, 2020, the disclosure of each is incorporated herein in their entirety by reference.

TECHNICAL FIELD

The present invention is related to an eyeglass frame comprising a hearing aid system, wherein the eyeglass frame comprises at least integrated microphones and a digital signal processor providing microphone beamforming, wherein the hearing aid system is in wireless communication with earbuds insertable into a human ear.

BACKGROUND

The present invention is related to an eyeglass frame serving as a support frame supporting different sensors providing functionality and data beneficial for a hearing aid system. Modern integrated circuit technology provides increased complexity and functionality on small sized wafers of respective circuits, which enables integration of sensors and an embedded computer system comprising at least one SOC (System On a Chip) and at least one DSP (Digital Signal Processor) in an eyeglass frame according to the present invention. Many SOC systems are supported by the LINUX operating system and LINUX device drivers supporting different types of sensors and DSP circuits are available as well.

An aspect of the present invention is a software application configuring the computer-controlled devices of the hearing aid system to perform different hearing aid functions like for example microphone beam forming.

Such beamforming can be done in an embedded DSP under control of a program running in an embedded SOC system and the beamforming can be configured to be in different directions relative for example to a front side of the eyeglass frame. Such changes of beamforming may also comprise changing a width of a beamforming lobe. Changing a beam forming lobe with respect to a direction and/or beam width may be configured to happen automatically dependent on sensor outputs from for example a gyroscope device embedded in the eyeglass frame under control of for example a SOC system. Changing a beamforming lobe can also be made by a user of the eyeglass frame according to the present invention through gestures detectable by an embedded gesture detection system also embedded inside the eyeglass frame.

Other types of sensors, for example a gyroscope sensor with several axis, a distance measurement sensor etc., may be embedded into the eyeglass frame and such sensor outputs may be part of a decision loop the SOC system can be configured to make whenever a microphone beamforming should be made, for example.

In prior art there are examples of different solutions for hearing aid systems. For example, JP 6514599 B2 discloses an eyeglass frame supporting directional microphones located on the front side of the eyeglass frame. Omni-directional microphones are provided on the respective left and right eyeglass arms. Loudspeakers are also provided on the left and right eyeglass arms.

In addition, there is a touch sensitive sensor on the left eyeglass arm. When the touch sensor is touched the directional microphones are activated and the audio signal is transmitted to the loudspeakers.

CA 2559844C discloses a system and a method providing acoustic communication. According to the teaching of this publication, an eyeglass frame (10) comprises at least one directional microphone (13, 15, 16) for detecting voice signals of a user (21), and communication means (12) for transmitting signals to electronic devices (30) such that the directional dependence of the at least one microphone (13, 15, 16) can be adapted according to the user. The directional microphones can be especially embodied as microphone arrays and/or according to MEMS technology.

U.S. Pat. No. 6,690,807 B1 discloses a listening assistance device (1) comprising hearing modules (3) mounted on the ends of the arms of an eyeglass frame (2), said modules being designed to support the eyeglass frame on the ear of the user. The hearing modules also have a formed part (5) which extends into the auditive canal without closing the latter and which includes the sound outlet hole (6) of the module. The modules comprise a speech spectrum frequency response and linear dynamics in order to improve speech intelligibility. This makes it possible to provide a listening assistance device compensating for mild hearing loss that can be produced easily and economically, is more comfortable to use and is not regarded at first sight as a hearing aid by an observer.

EP 3496417 disclose a hearing system adapted for a navigation system, and a method of performing navigation. An eyeglass frame with a plurality of different sensors like distance measurement sensors, magnetic field sensors etc. is used by the system over time to generate data representative of a current environment around a user. The system is further configured to localize the user of the system relative to one ore mor sound sources. For example, a map of localized radio field and magnetic disturbances can be provided in the form of a map visualised in a mobile phone in communication with the system. Beamforming of microphones is possible towards sound sources located and selected in the map.

OBJECT OF THE INVENTION

In particular, it may be seen as an object of the present invention to provide a hearing aid system comprising an eyeglass frame with audio processing capacity providing beamforming dependent on a direction and distance towards a sound source and a width of a sound source, for example a group of people.

It is a further object of the present invention to provide an alternative to the prior art.

SUMMARY

Thus, the above-described object and several other objects are intended to be obtained in a first aspect of the present invention by providing a hearing aid system integrable in an eyeglass frame comprising at least one microphone array on a front side surface of the eyeglass frame, a distance measurement sensor, a gyroscope sensor, wherein a Digital Signal Processor (DSP) controlled by a configured System on a Chip (SoC) provides at least a beamforming lobe dependent on respective sensor output signals, wherein a beamforming lobe direction to a sound source is defined relative to the configured microphone array, wherein a beamforming lobe width is defined based on a distance to the sound source, wherein relative angular changes detected by the gyroscope sensor in the defined direction of the beam lobe triggers the SoC system to upload a change of parameters in the DSP modifying the beamforming width in accordance with the detected angular changes, or wherein relative changes in the measured distance to the sound source detected by the distance measurement sensor triggers the SoC system to upload a change of parameters modifying the beamforming width in accordance with a perspective increase or decrease of a size of a sound source when the distance to the sound source changes.

FIGURES

The hearing aid system according to the present invention will now be described in more detail with reference to the accompanying figures. The figures illustrate examples of embodiments of the present invention and is not to be construed as being limited to other possible embodiments falling within the scope of the attached claim set. Further, respective examples of embodiments may each be combined with any of the other examples of embodiment.

DETAILED DESCRIPTION

Figure 1:
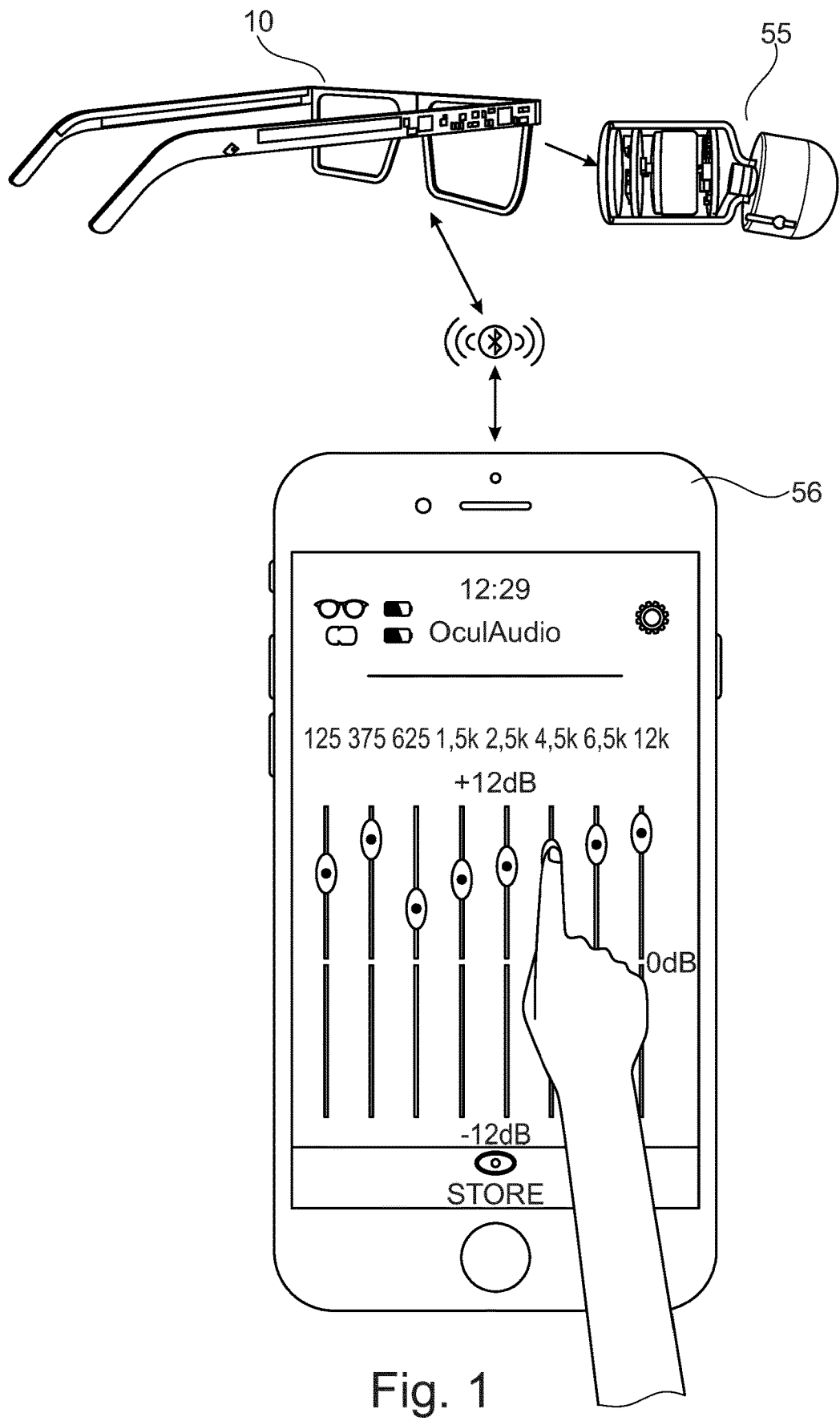
FIG. 1 illustrates an example of a hearing aid system according to the present invention.

Although the present invention has been described in connection with the specified embodiments, it should not be construed as being in any way limited to the present examples. The scope of the present invention is set out by the accompanying claim set. In the context of the claims, the terms "comprising" or "comprises" do not exclude other possible elements or steps. Also, the mentioning of references such as "a" or "an" etc. should not be construed as excluding a plurality. The use of reference sign in the claims with respect to elements indicated in the figures shall also not be construed as limiting to the scope of the invention. Furthermore, individual features mentioned in different claims, may possibly be advantageously combined, and the mentioning of these features in different claims do not exclude that a combination of features is not possible and advantageous.

An eyeglass frame according to the present invention may be used by people having partial hearing loss, but not necessarily having additional problems with their eyes. In such cases the eyeglass frame is just a support structure that can simplify for example beamforming of microphones embedded in the eyeglass frame. According to an aspect of the present invention, insertable earbuds can be in wireless communication with the eyeglass frame.

Beamforming of acoustical signals is a signal processing technique for enhancing acoustical signals from one or more directions while suppressing acoustical noise and acoustical interferences from other directions. Beam forming as such is known. It is common to use omnidirectional microphones, or directive microphones arranged in an array structure, for example a linear array. It is within the scope of the present invention to use different microphone array configurations as well as omnidirectional microphones as well as directive microphones, or a combination of both types of microphones.

Such beamforming can be done in with an embedded DSP under control of a program running in an embedded SOC system.

Other types of sensors, for example a gyroscope sensor, a distance measurement sensor etc., may be embedded into an eyeglass frame and such sensor outputs may be part of a decision loop the SOC system may be configured to make whenever a microphone beamforming should be made, for example.

If a person with partial hearing loss in addition has eyesight problems, the eyeglass frame according to the present invention may comprise an embedded video camera, which can be configured to enhance visual perception for a wearer of the eyeglass frame. The embedded video system and microphones can be configured to detect contours of common objects like a dust bin in a street, an approaching car, a bird singing etc. and the SOC system may be configured to convey audible voice messages indicating respective objects to the wearer of the eyeglass frame via insertable earbuds in the ear canals of the wearer of the eyeglass frame. This possibility of recognizing different objects may also be utilized in some beamforming scenarios, for example identifying a bird from the bird song and the direction to the bird. A beamforming may then be made in that direction, for example based on a gyroscope sensor readout identified when the eyeglass frame for example is turned towards the direction of the bird, or by using the microphone array to identify the direction.

In an example of embodiment of the present invention, the eyeglass frame is configured to provide communication with a smartphone, for example via WIFI communication. There are examples of application programs that may provide enhanced functionality of an eyeglass frame according to the present invention. For example, there is an app called "WHATBIRD" that can identify the name of a bird based on a recorded song of the bird. More information on www.whatbird.no. This is an example of a situation wherein a solution to an eyesight problem provides a solution to a possible hearing problem, and vice versa.

The present invention is providing a hearing aid system comprising an eyeglass frame with at least one embedded digital signal processor (DSP) receiving audio signals from a selected number of embedded microphones in the eyeglass frame, and the DSP is configured to provide different audio signal processing steps like microphone beamforming and general control like adjusting microphone amplification factors etc. of the embedded microphones. The eyeglass frame is configured to communicate audio signals wirelessly from the DSP to adapted earbuds insertable into ear channels of a wearer of the eyeglass frame.

Microphone beamforming amplifies sound signals from a specific location (or sound source directions) relative to a configured microphone array, while sound signals from other directions, or adjacent sound sources are muted or attenuated. This possibility helps a wearer using an example of embodiment of the present invention to filter out competing sound sources of no interest to the wearer. This may help a person with partial hearing loss to hear for example speech from a person much clearer when competing sound sources are attenuated.

In an example of embodiment of the present invention, an eyeglass frame may comprise a first set of microphones located on a front side of the eyeglass frame, a second set of microphones located on a first one of the two arms of the eyeglass frame, and a third set of microphones located on the second arm of the two arms of the eyeglass frame.

Each respective set of microphones can be configured to be a Broadside Array as known from the theory of microphone beamforming, or a selected number of microphones from the first set and the second set of microphones, or a selected number of microphones from the first set and third set of microphones can for example be arranged as an Endfire Array.

However, beamforming is also dependent on the type of scenario a person with partial hearing loss is part of. The example of beamforming above indicates one such situation wherein the conversation for example is between two persons, or between a person and a single bird. Another type of scenario may be when a person with partial hearing loss is participating in a conference with for example at least two other persons.

Therefore, a problem that may exist is how to increase for example a beamforming lobe width to cover more than one sound source, i.e., as in this example of a conference.

Another scenario can be that a person with partial hearing loss is walking in streets with a lot of noise present that can mask out speech from other people trying to say something to the person with partial hearing loss.

However, filtering away noise coming from for example a car approaching the person with partial hearing loss could be dangerous since the filtering can mask out the possible danger related to the approaching car. Therefore, a possible problem that may exist is how to distinguish between sound sources and provide beamforming towards specific sound sources without excluding some other sound sources. Other types of sensors may be embedded inside the eyeglass frame of the present invention which can for example detect approaching objects like a car, a bicycle, motor-bicycle etc.

A similar scenario is present when walking in a landscape like a village in the countryside, a walk in the mountains or in a forest etc.

Therefore, more than one spatial beamforming lobe may be necessary to arrange between different groups of embedded microphones. In addition, a detection of a possible origin of a sound can be necessary.

Another scenario can be when sitting on a train talking to someone sitting in front. A beamforming according to the present invention can be accurate thereby enabling good audible contact with a person in front of you. Such a sharp beamforming has also a downside. If you need to bend down, for example to find some papers, looking for your ticket etc., which has fallen out of your hands, this action may take some time. During this interval your sharp beamforming will point downwards to the floor and the audible contact is lost or severely mitigated.

Therefore, a microphone beam forming may depend on movements of a head wearing an eyeglass frame system according to the present invention. An embedded gyroscope sensor may be used to detect such movements and the system can be adapted to modify a microphone beam forming lobe to cover both the person sitting in front and down to the floor if such a movement is detected. When the head is detected to move upwards, the original beamforming lobe may be activated again. The microphone beamforming should take into account a change of an eyeglass frame orientation according to the present invention.

FIG. 1 illustrates a typical configuration of a hearing aid system according to the present invention. An eyeglass frame 10 is illustrated with the cover of the eyeglass arms removed. Internal to the eyeglass arms there is located programmable electronics like a DSP circuit, Bluetooth communication interface, a controller like a SOC chip (System On a Chip) etc. Batteries and other necessary logic/electronics is also embedded in the eyeglass arms and also possibly inside the front part of the eyeglass frame holding the eyeglasses. The DSP circuit embedded inside the eyeglass frame may be embedded inside both eyeglass arms, i.e., a left and a right-hand eyeglass frame thereby two DSP circuits can be used. In such circumstances one of the two DSP circuits is normally configured as a master device while the other DSP circuit is configured as a slave device, i.e., being controlled by the master device. The master DSP device is communicating wirelessly with earbuds 55 (or in-ear-headphones) that can be inserted into ear channels of a human.

When an earbud 55 is inserted in the ear channel of a left ear, and another earbud 55 is inserted into a right ear, a DSP in the left eyeglass arm may communicate wirelessly with the earbud inside the left ear channel while a DSP in the right-hand eyeglass arm is communicating with the earbud 55 in the right ear. The communication will be under control of the master DSP device, but this configuration allows different sound to be transmitted simultaneous to both ears. This feature will provide a sound environment for a user that is representative for sound sources on his left side respective right-hand side. The microphone array on the left eyeglass arm and the right eyeglass frame can be used for this purpose.

If a person with partial hearing loss in addition has eyesight problems, the eyeglass frame according to the present invention may comprise an embedded video camera, which can be configured to enhance visual perception for a wearer of the eyeglass frame. The embedded video system and microphones can be configured to detect contours of common objects like a dust bin in a street, an approaching car, a bird singing etc. and the SOC system may be configured to convey audible voice messages indicating respective objects to the wearer of the eyeglass frame via insertable earbuds in the ear canals of the wearer of the eyeglass frame. This possibility of recognizing different objects may also be utilized in some beamforming scenarios, for example identifying a bird from the bird song and the direction to the bird relative for example a front side of the eyeglass frame. A beamforming may then be made in that direction, for example based on a gyroscope sensor readout.

In an example of embodiment of the present invention, the eyeglass frame is configured to provide communication with a smartphone, for example via WIFI communication. There are examples of application programs that may provide enhanced functionality of an eyeglass frame according to the present invention. For example, there is an app called "WHATBIRD" that can identify the name of a bird based on a recorded song of the bird. More information on www.whatbird.no. This is an example of a situation wherein a solution to an eyesight problem provides a solution to a possible hearing problem, and vice versa.

Figure 6:
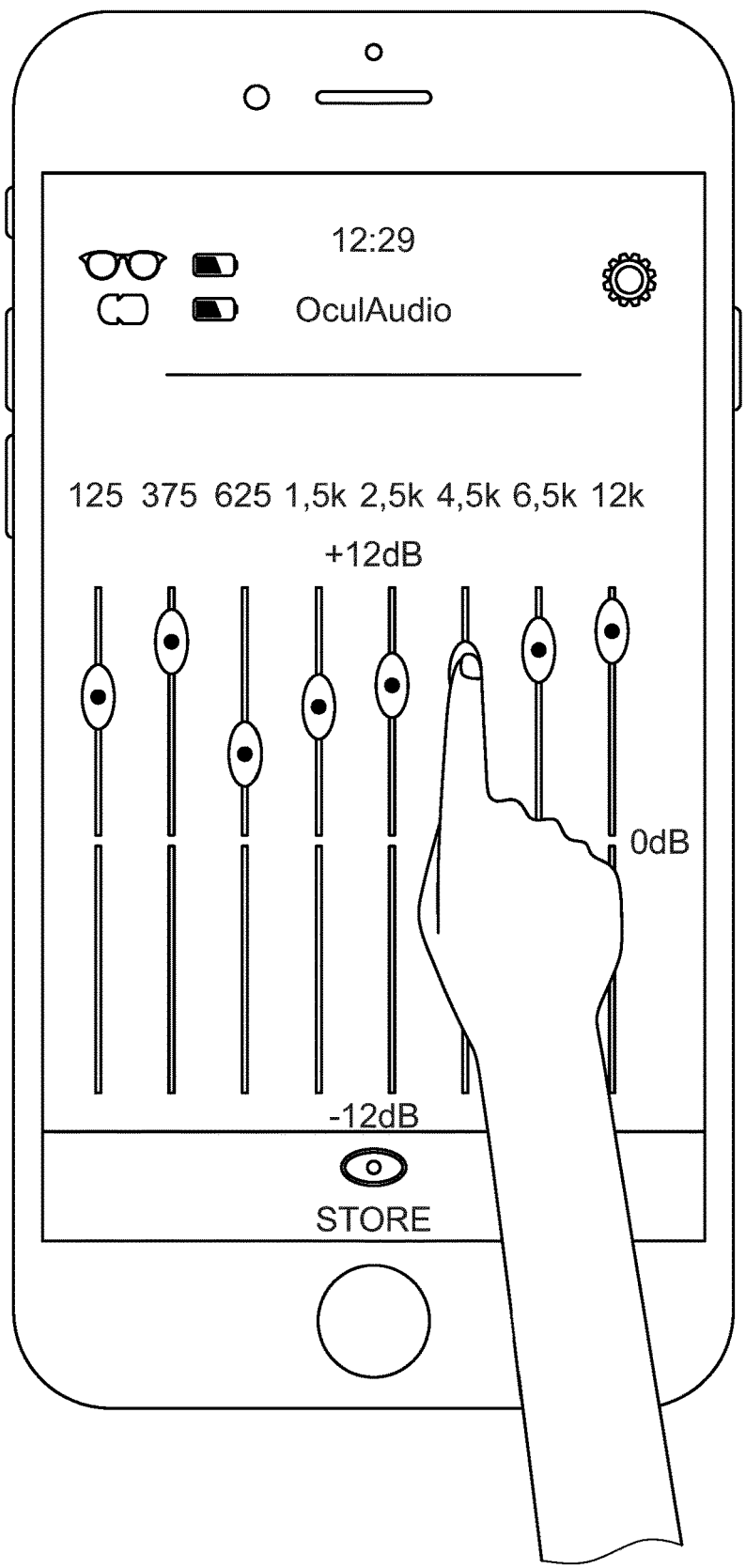
FIG. 6 illustrates an example of a user interface according to the present invention

A mobile phone 56 may also be part of a hearing aid system as discussed above. In FIG. 1 and FIG. 6 it is illustrated an application program in the mobile phone that acts as an equalizer, which communicates the user specified settings to the eyeglass frame 10, wherein for example a SOC circuit instructs or reprogram a DSP circuit to employ the requested frequency changes to the audio signals submitted to earbuds 55.

Figure 2:
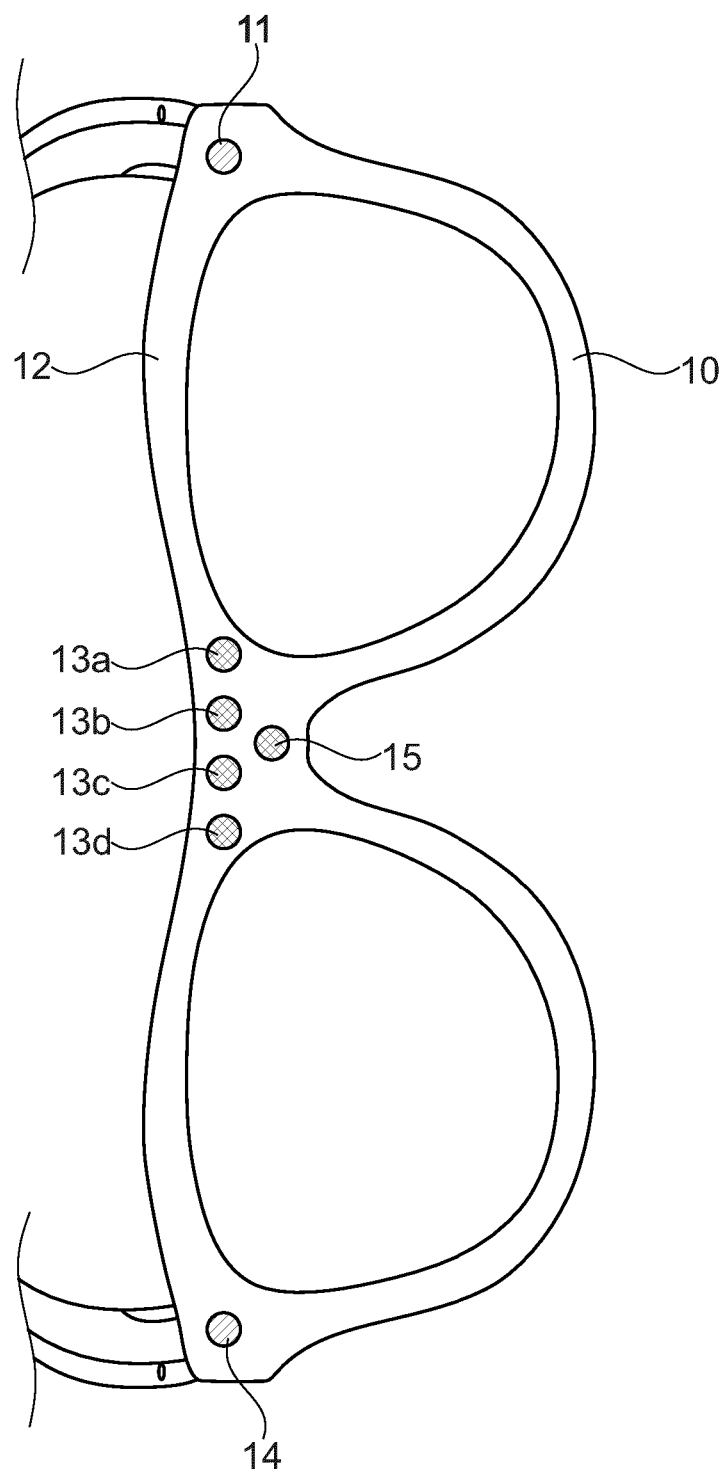
FIG. 2 illustrates a front view of an example of embodiment of the present invention.

With reference to FIG. 2, a front face 12 of an eyeglass frame 10 is illustrated. On the upper part of the eyeglass front 12 there is configured four digital omnidirectional microphones 13a, 13b, 13c, 13d facing forward relative to the front of the eyeglass frame. The microphones may be arranged as a broadside microphone array. In addition, there is a video camera 15 embedded in the front of the eyeglass frame located just above a nose ridge. In each corner of the front of the eyeglass frame, adjacent to where eyeglass arms are connected, there is a microwave transducer 11 in one corner and a microwave microphone 14 in the opposite located corner. Microwaves emitted by the microwave transducer 11 may be reflected by for example a human face and received by the microwave microphone 14. By measuring the lapsed timespan between the emission to detection of the microwaves the distance to for example a human face the eyeglass frame is facing can be calculated.

The digital omnidirectional microphones used in the illustrated example in FIG. 2 can be replaced by other types of microphones dependent for example on how microphone inputs of a DSP circuit are designed, digital or analogue etc. Further, omnidirectional microphones may be replaced by directive microphones, or the microphones are a mixture of omnidirectional and directive microphones. The choice of microphones influences the beamforming algorithm that the system can use to calculate respective parameters to be uploaded to a DSP circuit enabling the DSP to manipulate the respective microphone outputs to be according to a designed beam forming lobe. In the examples illustrated in this disclosure, omnidirectional microphones are used.

Figure 3:
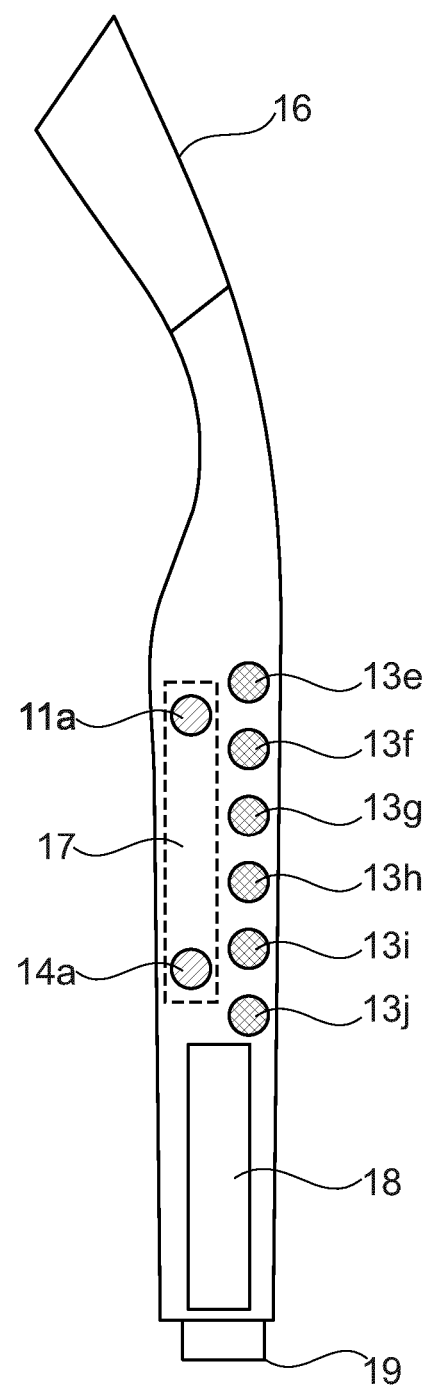
FIG. 3 illustrates further details of the example of embodiment illustrated in FIG. 2.

FIG. 3 illustrates an example of a configuration of an eyeglass arm 19. In the example of FIG. 3 there are arranged six omnidirectional microphones 13e, 13f, 13g, 13h, 13i, 13j that may be arranged as a microphone broad side array. In addition, there is a microwave transducer 11a and a microwave microphone 14a that may be used to measure distances to objects or persons approaching or which is in a close vicinity of a wearer of the eyeglass frame on the side the eyeglass arm is facing. Besides being part of a microphone beamforming of the six microphones 13e, 13f, 13g, 13h, 13i, 13j, the distance measure may also be part of a social distance buzzer application embedded inside the eyeglass frame according to the present invention.

The respective microphones in the front of the eyeglass frame and on the arms of eyeglass frame can be configured in different microphone arrays having different characteristics when used in a beam forming algorithm. At least some of the microphones around the eyeglass frame can be grouped into different arrays that can be used to support different beamforming lobes independently of each other, or some groups of microphones in respective arrays can be configured to operate together.

At the end of the eyeglass arm 19 there is a removable section 16 that is configured to support batteries for the electronics inside the eyeglass frame according to the present invention. It is also within the scope of the present invention to provide support for other types of sensors like a miniature radar system (or doppler shift detector) that can be positioned in the removable part 16 for example, wherein the radar may be configured to warn about approaching objects like cars coming from behind the wearer of the eyeglass frame according to the present invention.

FIG. 3 illustrates also an area 18 of the eyeglass arm surface that may comprise a gesture detection sensor enabling a wearer of the eyeglass frame according to the present invention to interact with the configured system of the eyeglass frame, for example by using a finger moving across a sensor surface with different detectable movement patterns.

In addition, there is also an optional area 17 that may be used to support other types of sensors.

It is within the scope of the present invention that eyeglass arms 19 may be replaced in an eyeglass frame 10 according to the present invention. This can be done for example when an eyeglass frame needs an upgrade, for example when there is a need of other types of sensors, or when a new version of the system is available.

The embedded electronics inside the front part the eyeglass frame can be connected to the electronics embedded in an eyeglass arm with a flexible or bendable printed circuit board as known in prior art.

Figure 4:
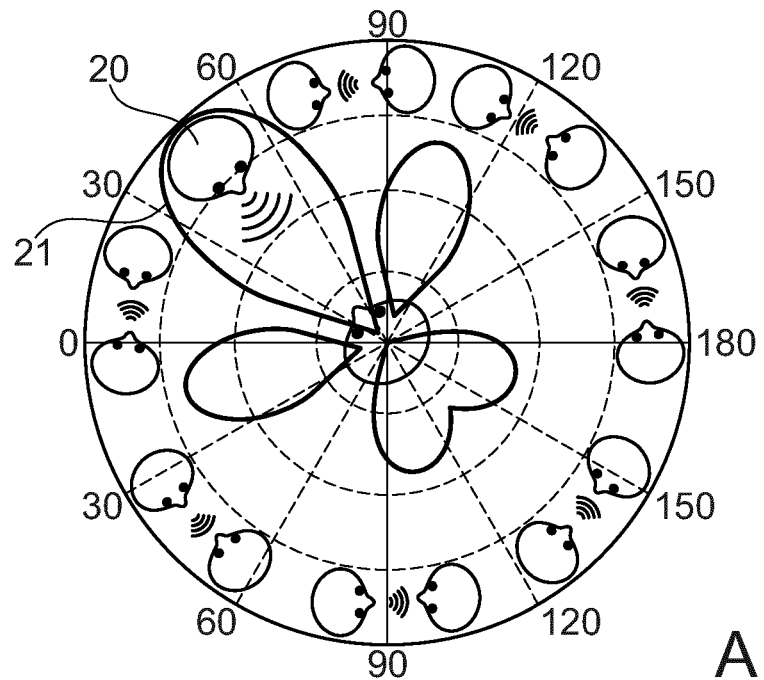
FIG. 4 illustrates an example of microphone beamforming according to the present invention.
Figure 4:
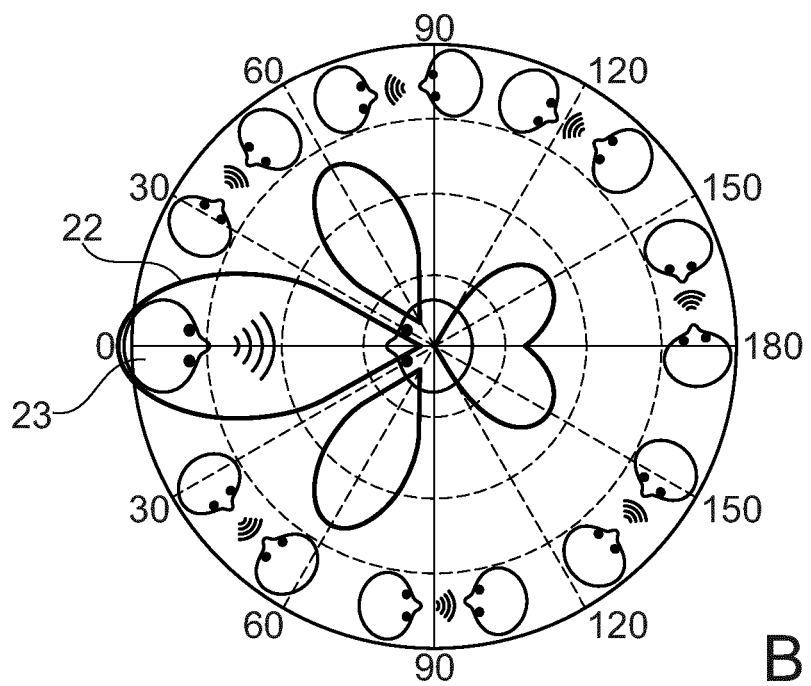

FIG. 4 is an illustration of microphone beamforming. A polar plot of a beamforming is illustrated. The centre of the circle in diagram A is a microphone array like the one on the front of the eyeglass frame as illustrated in FIG. 2. The beamforming is directed towards a specific person 20 and the microphone beamforming lobe 21 is directed towards the specific person 2. The wearer of the eyeglass frame 10 according to the present invention may at any time shift focus on another person 23 as illustrated in diagram B. The beamforming 22 is similar as the beamforming in diagram A. When shifting focus from the situation in diagram A to the situation illustrated in diagram B the user wearing the eyeglass frame is turning his head from the person 20 in diagram A to the person 23 in diagram B. However, there is no need of changing the beamforming between these two situations since the beamforming is relative to the microphone array on the front of the eyeglass frame.

However, a wearer of the eyeglass frame may optionally want to hear better from a side of his head as well. The microphones 13e, 13f, 13g, 13h, 13i and 13j illustrated in the example of embodiment of an arm 19 of the eyeglass frame 10 may be part of forming a microphone beamforming lobe 21, 22 of the microphone arrays both in front of the eyeglass frame and on an arm of the eyeglass frame. Then the beamforming may catch speech from the front as well from a side of the eyeglass frame. Such settings may be conveyed to the eyeglass system via gesture detection.

It is also within the scope of the present invention to provide segmented spatial beamforming. With reference to the example discussed above, the microphones 13a, 13b, 13c, 13d on the front side 12 of the eyeglass frame 10 can be used to define a first beamforming lobe pointing forward in the eyesight direction while the microphones 13e, 13f, 13g, 13h, 13i, 13j on an arm 19 of the eyeglass frame is used to form a second beamforming lobe pointing in direction, for example perpendicular to the omnidirectional microphone array on the arm of the eyeglass frame. It is also within the scope of the present invention that the second beamforming lobe may point in other directions, for example forward in the eyesight direction, or opposite the eyesight direction enabling hearing sound better coming from a side of the eyeglass frame, from the front of an eyeglass frame, or from behind an eyeglass frame.

It is also within the scope of the present invention that a third beamforming lobe may be defined with the microphone array located on the arm of the eyeglass frame opposite the arm supporting the second beamforming lobe.

Figure 7:
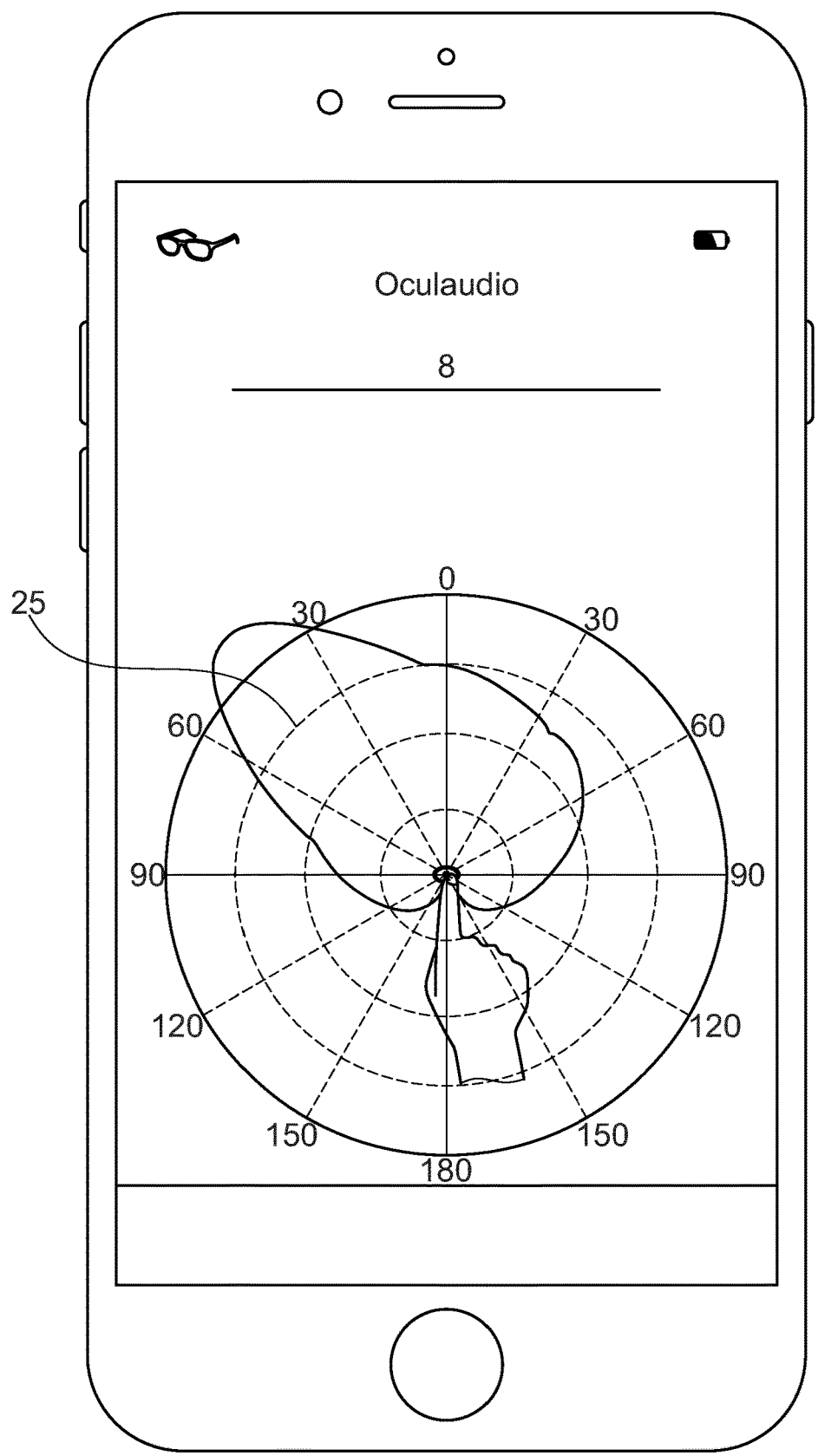
FIG. 7 illustrates another example of a user interface according to the present invention.

With reference to FIG. 7, an illustration of a graphical interface enabling microphone beamforming is illustrated enabling a wearer of the eyeglass frame to graphically change a microphone beamforming. For example, Analog Devices is a supplier of DSP circuits that also supplies this kind of apps with graphical interfaces to some of their DSP circuits. Anyhow, beamforming as such is controlled by an application program running in the SOC system embedded inside the eyeglass frame 10. Any DSP circuit, including DSP circuits from Analog Devices, have general programming utilities enabling development of specialized algorithms providing for example microphone beamforming.

Beamforming as such is a known technique in prior art. One example of a known difficulty that might be present when making a microphone beam forming is the phenomena called aliasing. With reference to FIG. 6, an example of an application according to the present invention is illustrated. An equalizer interface in a mobile phone communicating with a DSP integrated into an eyeglass arm of the eyeglass frame may help a user to compensate for partial hearing loss related to certain frequency ranges. When such frequencies are changed it is a possibility that an aliasing problem related to the beamforming may be amplified.

Figure 5:
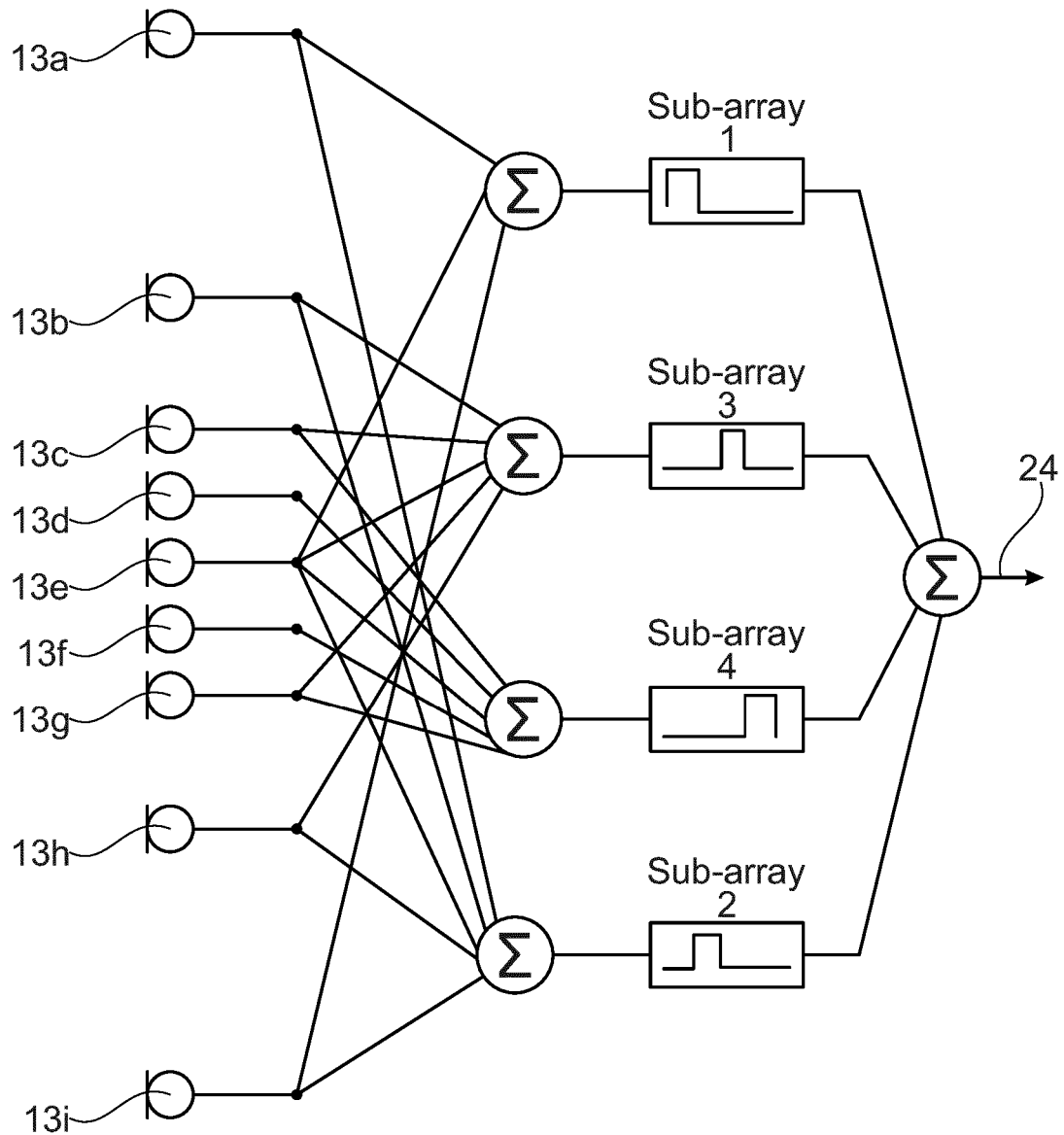
FIG. 5 illustrates an example of a microphone beam forming algorithm according to the present invention.

FIG. 5 illustrates graphically an example of a microphone beamforming algorithm disclosed by A. McCowan in the thesis "Robust Speech Recognition using Microphone Arrays," PhD Thesis, Queensland University of Technology, Australia, 2001. With this architecture microphone outputs from the microphones 13a, 13b, 13c, 13d, 3e, 13f, 13g, 13h, 13i etc. is summed together in different patterns.

When covering broadband signals, it is possible to implement the array as a series of sub-arrays, which are themselves linear microphone arrays with uniform spacing. These microphone sub-arrays are designed to give desired response characteristics for a given frequency range.

One aspect of this architecture is that when the frequency increases, a smaller microphone array length is required to maintain constant beamwidth. In addition, to ensure the sidelobe level remains the same across different frequency bands, the number of elements in each sub-array should remain the same. The sub-arrays are generally implemented in a nested fashion, such that any given sensor may be used in more than one sub-array. Each microphone sub-array is restricted to a different frequency range by applying band-pass filters, and the overall microphone broad-band array output is formed by recombining the outputs of the band-limited microphone sub-arrays. Due to this possibility, it is possible to combine an equalizer as discussed above with reference to FIG. 6. The frequency of the respective band pass filters may be adapted to the equalizer settings.

Figure 8:
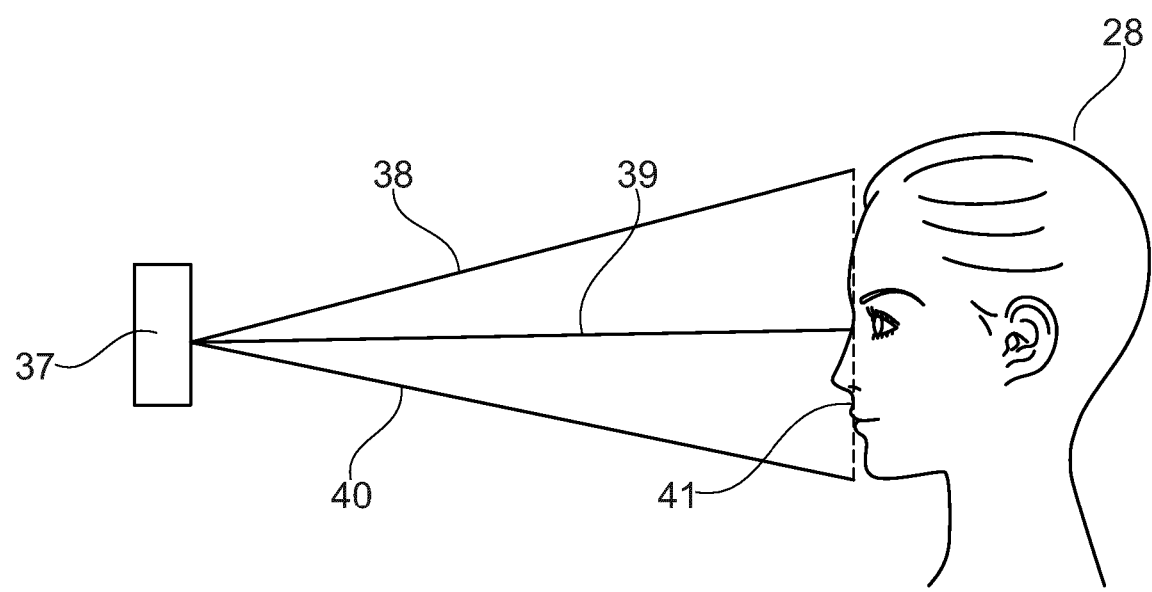
FIG. 8 illustrates an example of microphone beam forming according to the present invention.

As mentioned above, a video camera 15 may be embedded on a front side 12 of an eyeglass frame according to the present invention. FIG. 8 illustrates a side view of a microphone array 37 comprising a video camera in the middle section (not illustrated). The camera sees the face 28 in a distance 39 from the microphone array 37. The distance is illustrated being to a plane passing the front of the face 28. The height of the face 41 defines the slope of the side lines 38 and that together with the plane representing the height of the face constitutes a triangle in the plane, but which is a cone in three dimensions, i.e., which cone represents a desired beamforming when listening to the face 28.

Figure 9:
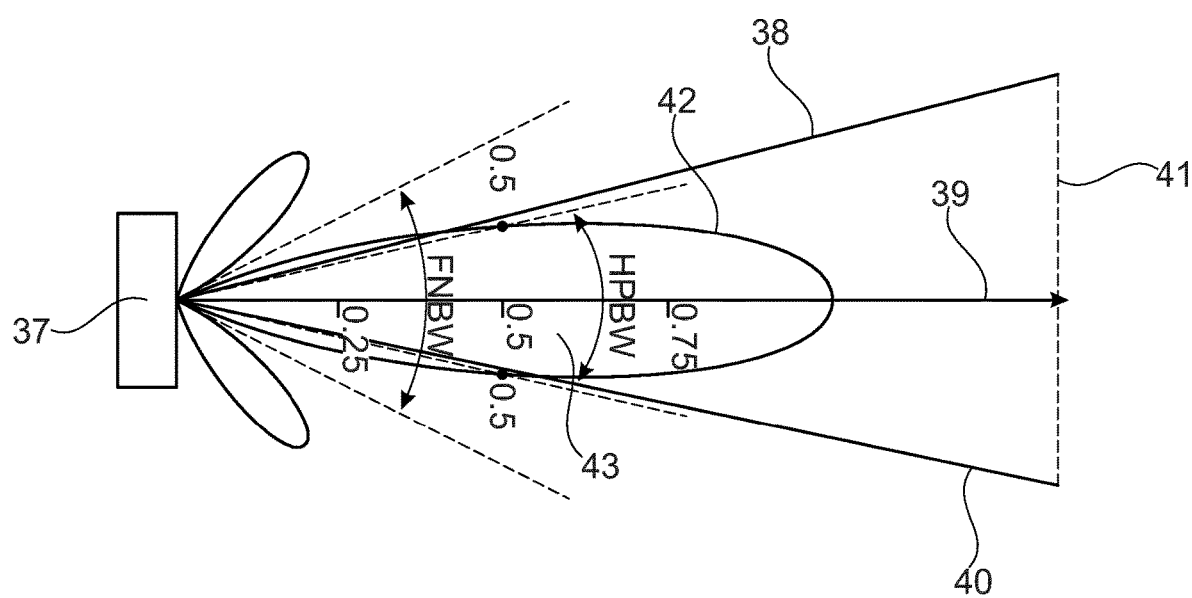
FIG. 9 illustrates further details of an example of microphone beamforming according to the present invention.

This is illustrated in FIG. 9 wherein a beamforming lobe 43 is arranged inside the triangle of FIG. 8. It is also illustrated some side lobes, which can be eliminated or reduces by proper selection of parameters for an algorithm as illustrated in FIG. 6.

The beamforming lobe 43 has a perimeter 42 that fits inside the triangle defined by the lines 38, 40 and 41. With reference to FIG. 8, when the distance 39 is reduced the perspective view as seen by a video camera 15 in the beamforming array 37 will increase the height 41 proportionally as seen by the video camera. When the distance 39 is increased the perspective view as seen by the video camera 15 will decrease the height 41 proportionally as seen by the video camera.

Therefore, measuring a distance from the microphone array towards a sound source (or object) and the height (or width) of a sound source (or object) can be the basis of defining a beamforming lobe 43 as illustrated in FIG. 9, i.e., a width of a beamforming lobe.

Figure 10:
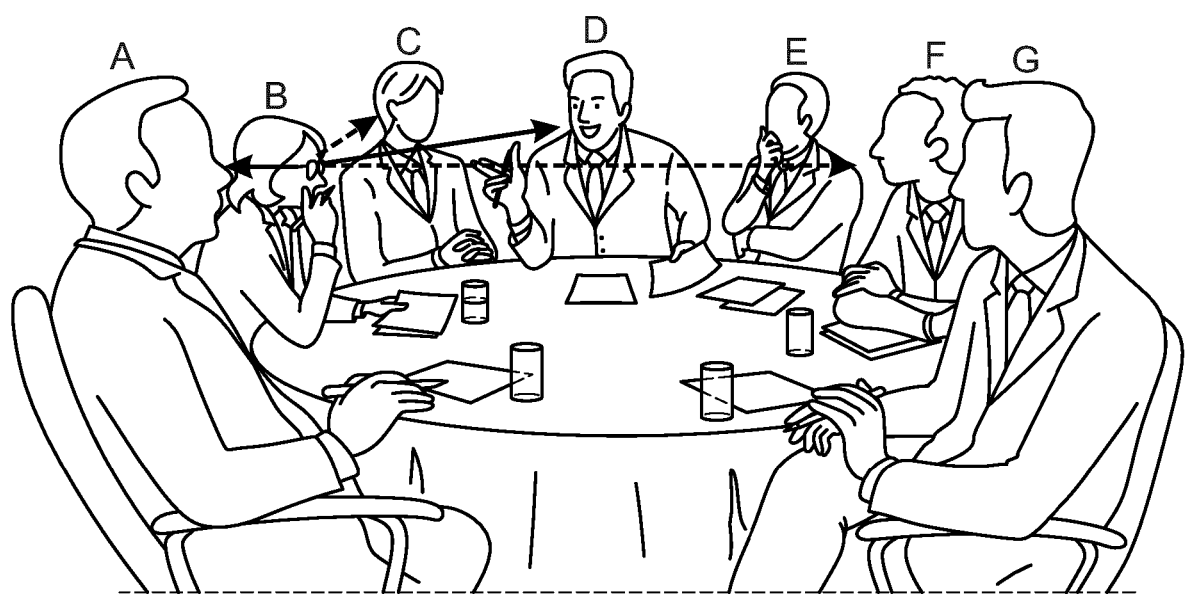
FIG. 10 illustrates another example of microphone beamforming according to the present invention.

FIG. 10 illustrates a scenario typical for a conference where participants sit around a table. Person B is wearing an eyeglass frame 10 according to the present invention. The video camera 15 and the video image processing can detect that persons C, D, E and F is within the field of view of the camera. Person A is also participating in the meeting but is outside the field of view of the video camera 15. On the right-hand eyeglass arm 19 of the eyeglass frame 10 supported by person B, there is a microphone array as discussed above. There is also a possibility to perform distance measurement with the respective microwave devices 11a and 14a. Thereby a beam forming based on the microphone array located on the eyeglass arm 19 facing the person A is possible. This can be done on both sides of the eyeglass frame. Thereby the eyeglass frame is configured with three different pointing beamforming lobes.

In an example of embodiment of the present invention, a gyroscope sensor may be part of an eyeglass frame system. When a gyroscope sensor detects a change of direction of the head as discussed above it is possible to change the width of the lobe thereby increasing the lobe including all persons B, C, D, E, F and G. Another possibility is that the hearing aid system is configured with just one narrow beam forming lobe. This lobe geometry may permit the wearer of the eyeglass frame to keep the same lobe while the wearer rotates his head towards the respective persons B, C, D, E, F and G one at a time thereby having good hearing quality for each person.

However, in a conference with several people it may be necessary to be able to hear everyone more or less simultaneously.

The increase of the width of the beamforming lobe discussed above may not be done symmetrical around the centre line of the lobe. For example, if the gyroscope detects a movement of the eyeglass frame to the right, the left side of the lobe can be left stable relative to the positions of the people while the right side of the lobe is increased as if the right side of the lobe follows the movement of the turning eyeglass frame. If the eyeglass frame is turned backwards towards the start of this process the right side of the lobe can follow the head movement backwards again. This is possible to achieve with using gyroscope readings to control the shape and width of the beamforming lobe.

Figure 11:
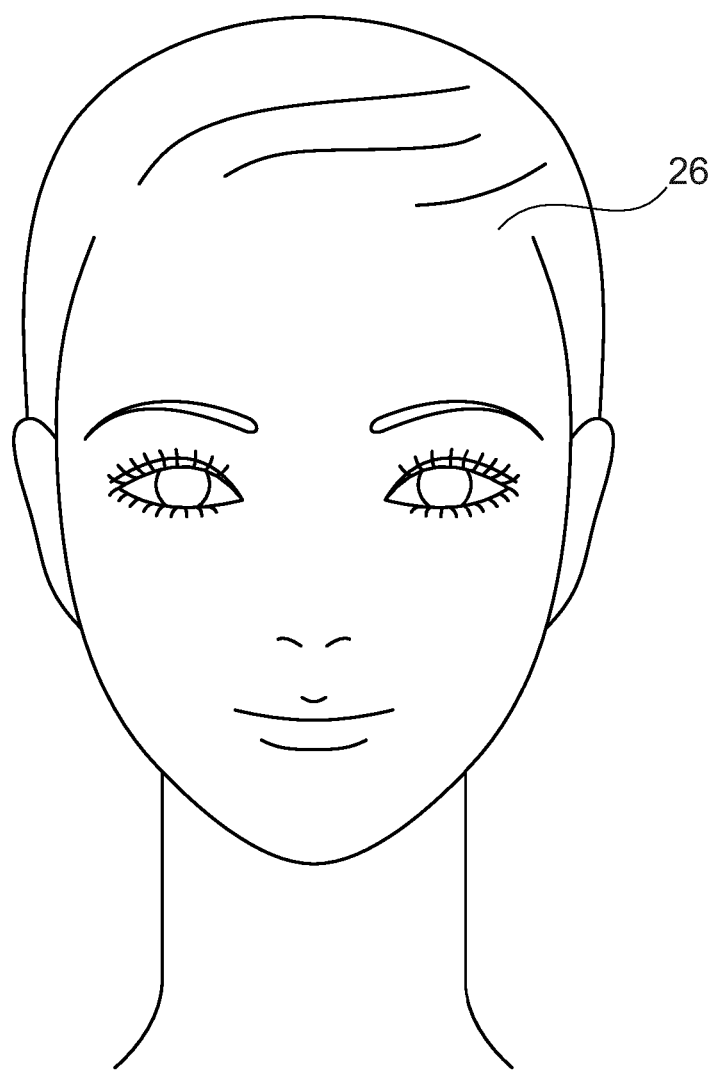
FIG. 11 illustrates an example of a video frame.

FIG. 11 illustrates a video frame comprising a head 26 facing directly towards for example a video camera 15 located on the front 12 of an eyeglass-frame 10. The eyeglass-frame 10 communicates video signals to a video processor or a video process embodied as a program running in for example a SOC computer system. The video process is configured to provide a face detection. This process is different from face recognition. The purpose of a face detection is to make sure it is a human face in the video frame without any need to know the identity of the person for example. There exist several programs in the literature regarding face detection algorithms. However, one aspect of the present invention is to reduce power consumption as much as possible which requires the use of simpler algorithms.

Figure 12:
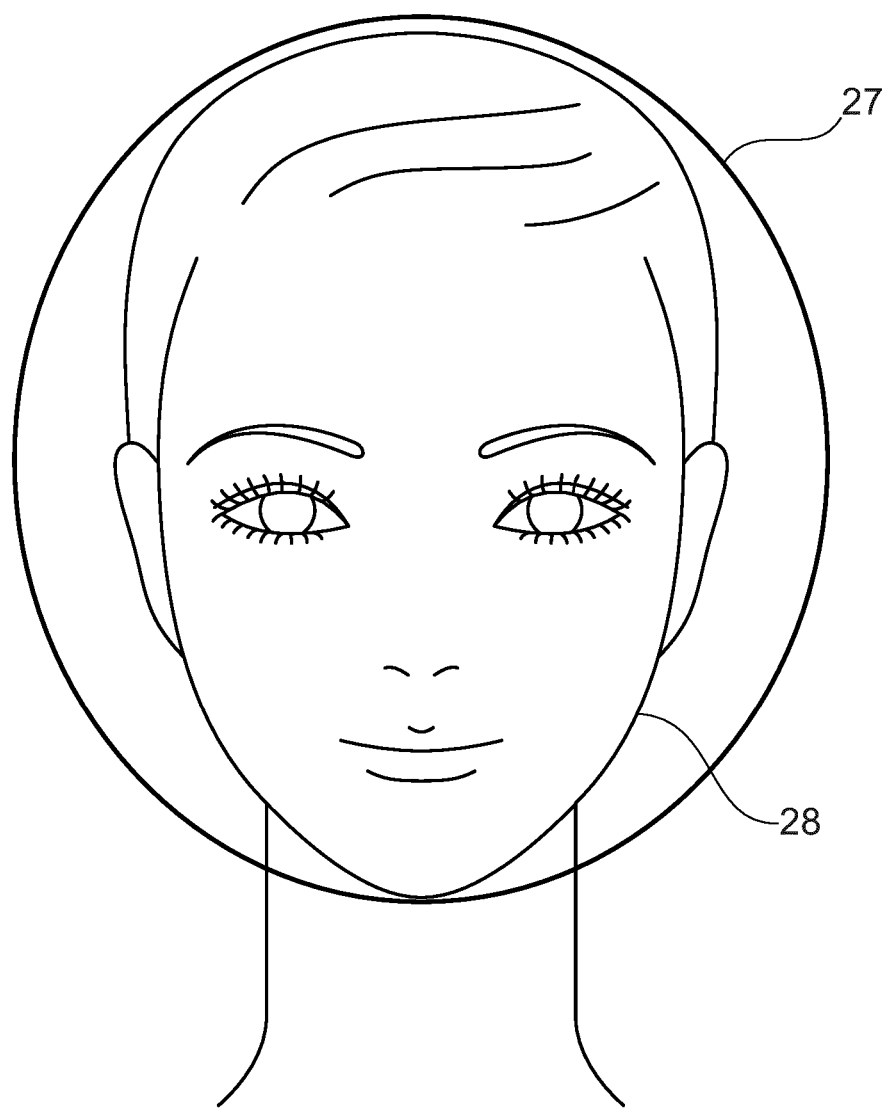
FIG. 12 illustrates an example of face detection according to the present invention.

According to an aspect of the present invention, a face detection can be simplified by using techniques derived from for example optical character recognition techniques. For example, with reference to FIG. 12, the pixel version of the image of the head 26 will have a zone around the face contour 28, which is possible to detect with edge detection as known in OCR technique. The face contour 28 will leave a distinct change in grey scale levels between adjacent pixels around the contour if it is a black and white image or a change in colour between adjacent pixels. This change of colour or grey scale levels indicates the contour 28. It is not necessary to detect the whole contour 28 accurate, only a part, such that a circle 27 can be imposed over the image of the face. It is not necessary with a high degree of accuracy. When the circle is in place, a coordinate system may be imposed on the image as disclosed in FIG. 13. The squares or rectangles formed by the horizontal lines 29 and the vertical lines 30 forms squares over the image of the face, which simplifies searching for biometric information that can identify that this is human face or not. From face recognition systems the biometric information regarding relative position between respective eyes and distances between respective eyes and a mouth should be within known limits. Other features can be the relative position of a nose bridge, contour of lips, ears, chin etc.

However, these features are used when a recognition of a person is the object of the detection. Within the scope of the present invention, identification of position of eyes are the key to detect that the image is of a human. An additional confirmation may be by adding a detection of a mouth and position of the mouth relative to the eyes. The purpose of a face detection according to the present invention is never to detect a person's identity, only that it is a human face.

Figure 13:
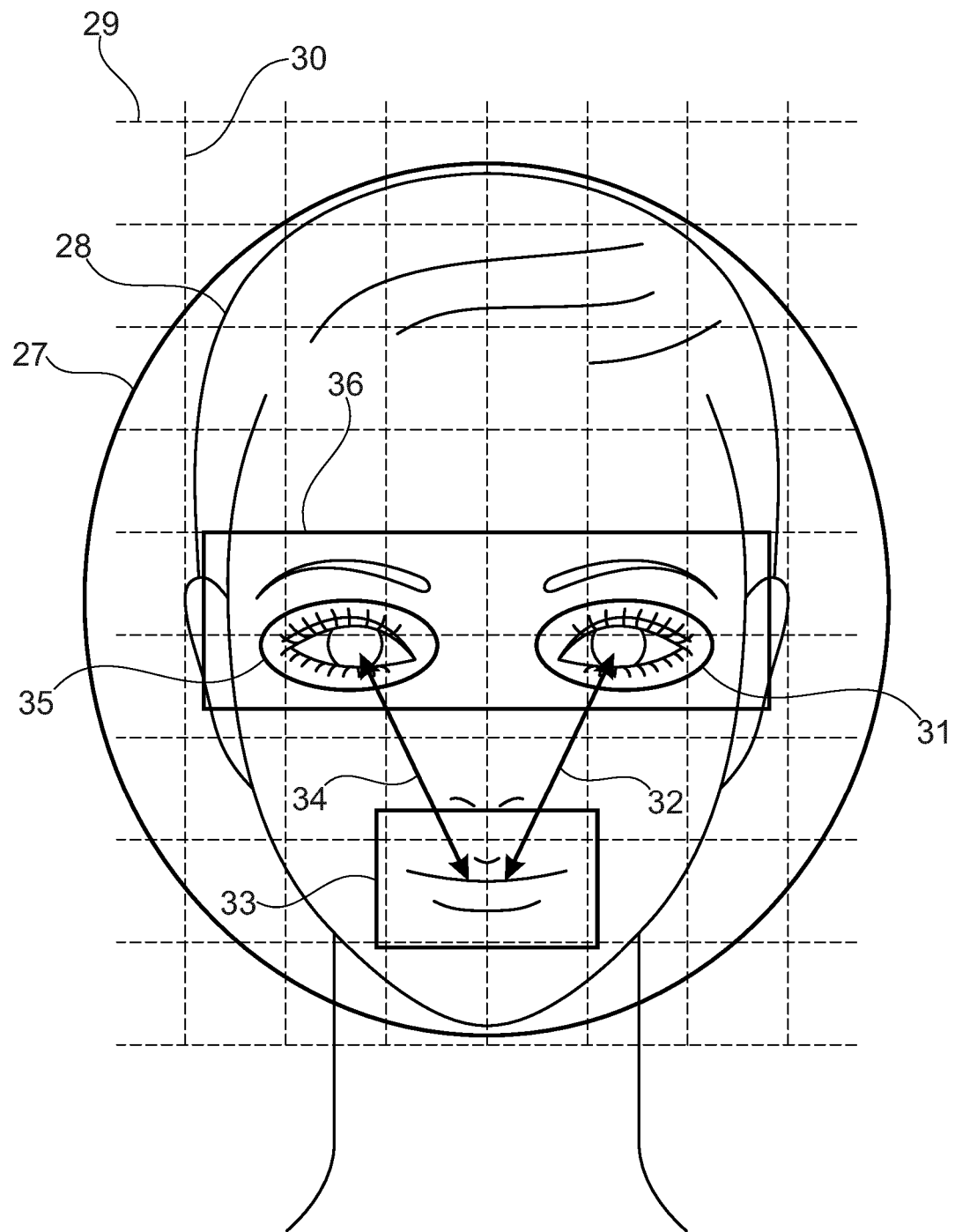
FIG. 13 illustrates further details of a face detection according to the present invention.

With reference to FIG. 13, a rectangle 36 is located over the image of the face at a location given by the position of the squares and the general knowledge of biometric data that indicates where eyes of a person most probably are located inside the circle 27. The rectangle 36 is made larger than the biometric known range of eye sizes. The purpose of the rectangle 36 is to indicate wherein a pattern search or template search for an eye pupil should be performed. A template representing an eye template, which implies an oval formed object with a circular centre of a different grey scale colour of colour is located. By gliding such a template over the image located inside the left part of the rectangle 36, an identification of an eye can be established. The same procedure may be done for the right hand located eye. In some instances, this may be a sufficient detection of a human head contour 28. However, it is also within the scope of the present invention to search for a mouth in an image of a human face. A rectangle 33 may be located above the potion wherein biometric data tells wherein a position of a mouth is normally. Then searching in central part of the rectangle 33 can be done with a template matching indicating an upper lip and a lower lip. The respective distances 32 and 34 can then be used as an additional confirmation criterium.

The matching between pixels of an image and pixels of a template can be done with a simple correlation analysis. Low score for the correlation indicates no similarity while a high score indicates a higher probability of similarity. This process can also be subject to training of the algorithm with example images.

If the outcome of the face detection algorithm is inconclusive, i.e., between high or low score, the system may be configured to ask, via configured voice communication to earbuds 55 inserted into the ears of the wearer of the eyeglass frame, to ask the user of the eyeglass frame to confirm that it is a human face by for example performing a defined gesture that can be identified by for example a gesture sensor 18 located on an eyeglass arm 19.

Even though a human wearing an eyeglass frame according to the present invention is capable of seeing a person and could tell the system about this via a configured gesture detected by the gesture sensor 18, it is an aspect of the present invention that the face looking towards the wearer is showing both eyes.

Further, a range confirmation performed by the microwave sensors 11 and 14 that the distance to the face is below a certain defined limit, for example 10 meters, will provide a degree of certainty that the detected person actually is capable of talking to the wearer of the eyeglass frame, and since both eyes are detected the person is probably looking in a direction towards the person wearing the eyeglass frame.

Otherwise, the wearer of the eyeglass frame might use the beamforming capability of the eyeglass frame to spy or listening to other people's conversations without their consent. Therefore, it is within the scope of the present invention only to enable microphone beamforming towards people that probably is participating in a conversation, i.e., is looking towards the wearer of the eyeglass frame within a limited distance.

However, in some examples of embodiment of the present invention wherein a person wearing the eyeglass frame system according to the present invention in addition to hearing problems has limited visual sight, an embedded video processor may be configured to provide face recognition of a set of different persons based on downloaded pictures of the respective persons, wherein the system is configured to transmit a voice message comprising the name of respective recognized persons. Such persons could be close relatives and/or friends, colleagues etc.

Figure 14:
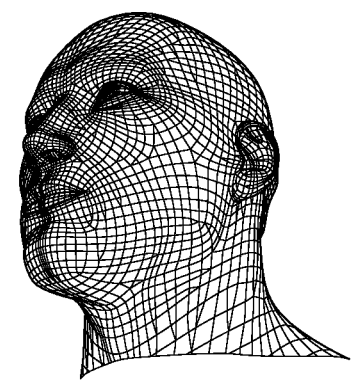
FIG. 14 illustrates different human head positions relative to a video camera recording.
Figure 14:
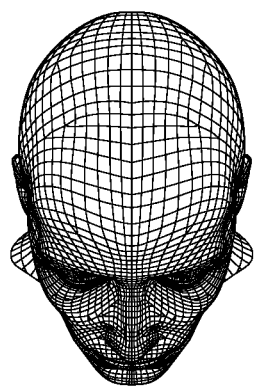
Figure 14:
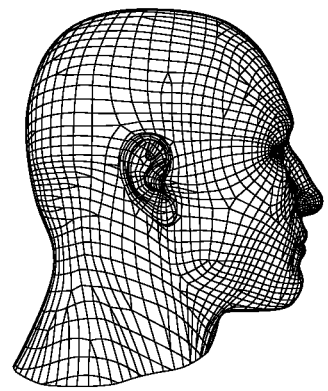
Figure 14:
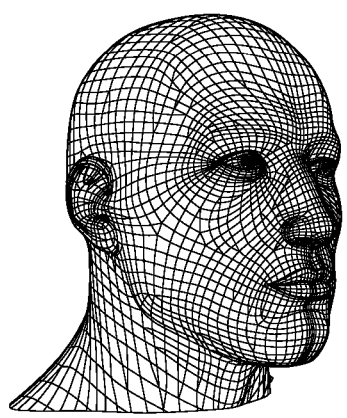
Figure 14:
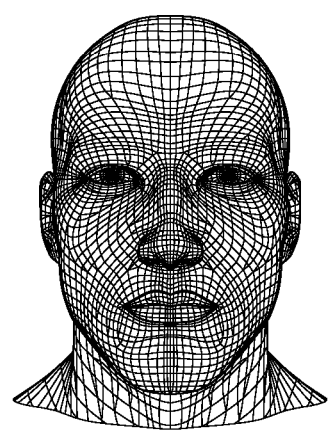
Figure 14:
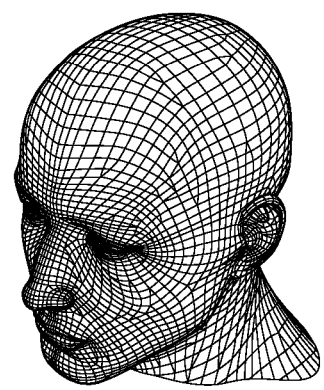

FIG. 14 illustrates a sample of different head positions relative to a field of view of a video camera. Only image E of FIG. 11 fulfils the criteria set above of showing two eyes directed towards a camera. Image D and F may probably be identified with a lower probability and could trigger the system to ask for a confirmation. Since the person(s) in question is looking away the response to the confirmation should be no, or the wearer of the eyeglass frame confirms that he wants to have a conversation with this person.

FIG. 8 illustrates how an example of beamforming may start, for example with a detection of a human face 28 being at a distance 39 from a microphone array 37 on an eyeglass frame 10. The height 41 of the face is normally greater than the width of the face and is therefore used to define a cone with origin in the centre of the microphone array and the side lines 38 and 40 of the cone constitute a triangle in the plane perspective. Since the distance 39 can be variable, i.e., the person may stand one meter from the eyeglass frame or ten meters away from the eyeglass frame the height of the face 41 will be different as a function of the distance 39 due to the perspective aspect. The longer away the face is located the smaller the height 41 will be. However, a relationship between a known standard height, or average height, of a face at one meter's distance can easily be used to calculate the perspective reduction of the height of the face on a ten meter's distance for example. Therefore, calculating the dimensions of the correct triangle is possible. When this is done a beamforming should be performed and a beamforming lobe 42 as disclosed in FIG. 13 should be calculated and be processed by a DSP. The length of the lobe 42 along the distance line 39 does not represent any form of limitation of what the microphone array 37 might hear clearly inside the beamforming lobe 42. The beamforming plot is a polar plot. However, amplification of sound is also part of the beamforming and can be adjusted automatically to a defined limit in a DSP for example or be adjusted manually by a wearer of the eyeglass frame, for example via gesture control detected by the gesture sensor 18.

There are many different shapes of microphone beamforming lobes the system should be able to handle. One aspect is to calculate a specific lobe based on distance etc. as discussed above. However, this may require battery power, which should be conserved as much as possible in the eyeglass frame. Therefore, it is within the scope of the present invention to have precalculated parameters defining different beamforming lobes that can be uploaded to an DSP whenever such a precalculated lobe is required. There are still other parts of such a microphone beamforming lobe that can be modified in runtime. For example, the width of a beamforming lobe may be adjusted by changing a limited number of parameters without affecting other parameters. This ability is dependent on the type of DSP that is used in an example of embodiment of the present invention.

The examples of different scenarios above require some standard beamforming lobes that can be precalculated, for example by a simulation program or configuration program shipped together with a specific DSP circuit. However, as discussed above, there is also a need for modifications of a beamforming lobe, either automatically or due to a user input like detections of a specific gesture.

For example, adapting a beamforming lobe by increasing the width can be connected to a gyroscopic readout indicating a degree of angular movement of a head resulting in either increasing or decreasing the beam forming lobe width.

An aspect of the invention is that every measure of angular changes or changes in distance to/from an object is relative to the eyeglass frame itself that supports respective microphone arrays. Therefore, when a beam forming lobe is increased due to a gyroscope readout, the angular increase can be a relative value added to the direction of the beamforming lobe initially set by the beamforming in the DSP circuit. Therefore, it is possible to have tables of respective DSP settings associated with a defined relative angular increase or decrease, for example for each degree of change. Such tables can be stored in a memory of the SoC circuit, and when a gyroscope detects a change in direction, increasing or decreasing angle, the value of the change can be used to fetch a table of DSP setting that is close to the angular change which can be uploaded by the SoC system to the DSP.

A "zero" direction relative to front face of the eyeglass frame can be set by a user of the eyeglass frame at any time via a defined gesture or via a mobile phone in communication with the eyeglass frame.

A change of a beamforming lobe due to a change in distance to an object like a bird or a person can also be linked to different beamforming lobe widths. For example, a person staying at a certain distance requires a certain dimension of a beamforming lobe width. Due to the perspective increase when a person moves towards the eyeglass frame the beamwidth should be correspondingly increased to cover the face of the moving person. When a person moves away the beamwidth should be decreased. These changes are of course limited due to practical reasons. A person standing just in front of the eyeglass frame does not need to be covered by a beamforming lobe. When a person is standing at a long distance from the eyeglass frame a minimum beamforming lobe width can be defined as a default width. However, all these changes are relative to the position of the eyeglass frame, i.e., the distance for example increases if the wearer of the eyeglass frame moves away from another person, and also the person moves away.

Therefore, different relative distance changes can be associated with different beamforming lobes stored in tables. When a certain distance change is detected by a distance measurement sensor, the value of the distance change is a relative value, and the SoC system can be configured to fetch a specific table corresponding to a closest precalculated distance change and upload these values to the DSP.

A "zero" distance can be set by a user initializing the system with for example a gesture input.

It is also within the scope of the present invention to utilize detected angular changes and/or distance changes dependent on respective microphone array configurations. Different tables can be made dependent on which array configuration is in use. Distance measure sensors can also be embedded on the eyeglass arms of the eyeglass frame. Therefore, beamforming of defined beamforming lobes on each side of the eyeglass frame can also be modified with respect to angular changes of an eyeglass frame as well a change in distance to an object.

Another aspect of perspective increase/decrease of an object inside a video frame is that a direction of movement of an object can be detected. Respective distance measurement sensors can also be used to detect direction of movement of an object. If such distance measurement is repeated with a fixed frequency it is possible to measure the rate of change of the distance, and the speed of the object can be measured. Thereby speed and direction towards or away from the eyeglass frame is possible to establish. This can for example be used to warn about an object approaching at a high speed like a car. A voice message to an ear would prompt the wearer of the eyeglass frame to turn his head to view what is approaching. This is an issue important for people with reduced eyesight.

Another application of the distance and distance change measurements can be to implement a social distance buzzer. If an object approaches within for example 2 meters the social distance buzzer application can trigger a voice message and a warning is issued.

It is within the scope of the present invention to provide a selection of different scenarios a user of the eyeglass frame may select among to adapt a hearing situation to his needs.

For example, a "portrait mode" includes detecting one face at a time and performing an optimized microphone beamforming for each detected face, but only for faces within a defined range from the eyeglass frame. Another mode could be a "landscape mode" wherein the microphones listen to the whole surrounding, for example identifying birds as disclosed above.

Such specialized modes may be activated from more general modes. For example, the "landscape mode" may be configured to listen for bird songs and when a wearer of the eyeglass frame according to present invention is turning his head towards a sound source like a bird the specialized "bird song" mode may be activated.

It is also possible to configure the hearing aid system to provide some analysis of audible sound received from a sound source, and based on frequency components in the sound waves, it is possible to characterize the sound as coming from a human etc. The hearing aid system may be configured to use audible sound from a sound source the beamforming is pointing at to calculate a probability factor if the sound source is a human talking, a motor, a train or another type of sound source.

According to an example of embodiment of the present invention, a user profile defining settings of user specifications may be part of the execution of different hearing modes.

Figure 15:
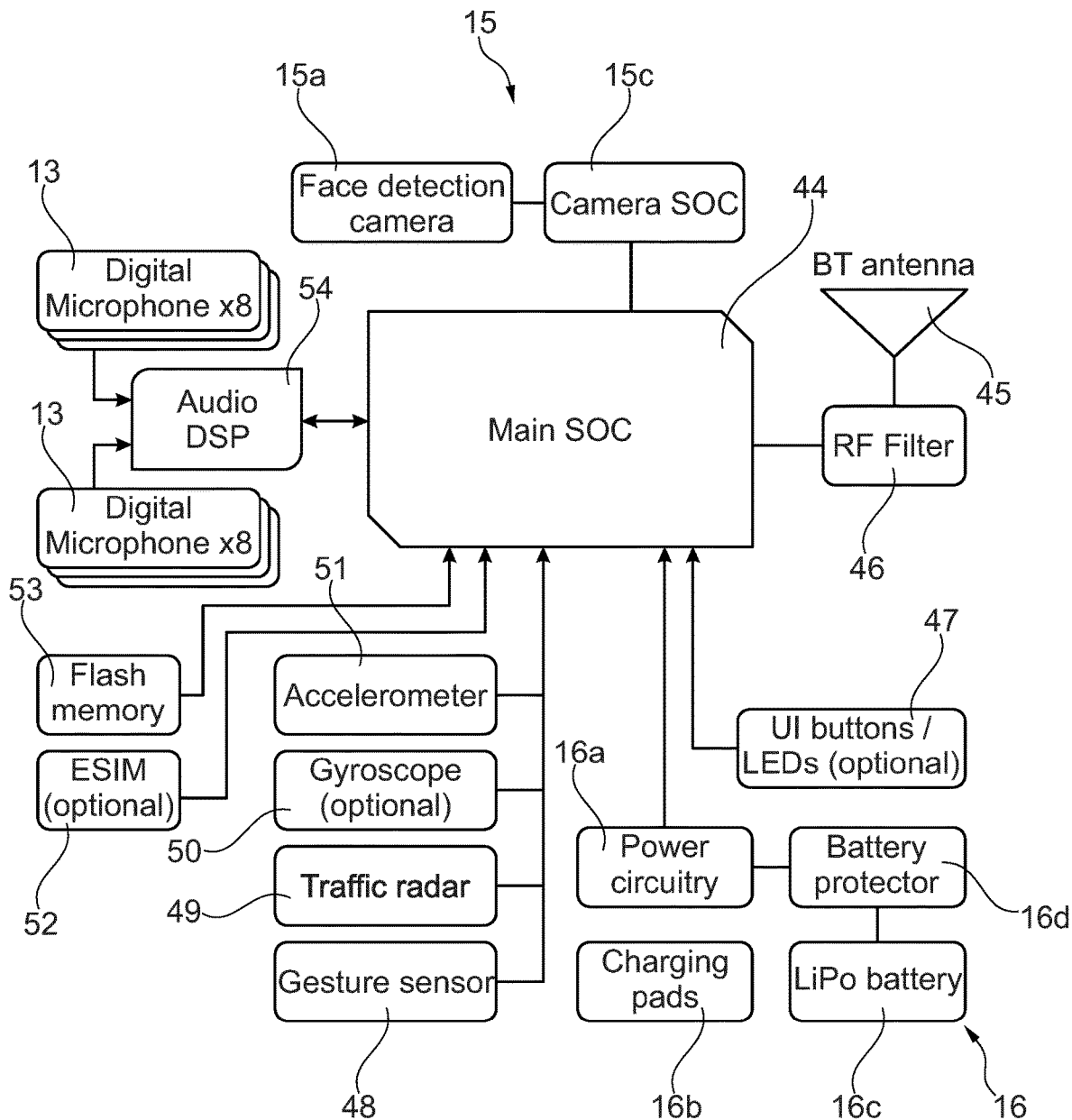
FIG. 15 illustrates an example of a hardware configuration according to the present invention.

FIG. 15 illustrates an example of embodiment of an eyeglass frame system according to the present invention comprising functional digital circuits and functional blocks embedded inside an eyeglass frame as illustrated in FIG. 1.

For example, digital microphones 13 may be of the type TDK ICS-41251 which can be connected to an audio signal processor 54 for example of the type Analog Devices ADAU1787 that can receive audio input from 8 digital microphones. As discussed above there are two DSP devices in an eyeglass frame, one in each eyeglass frame, and in an example of embodiment six microphones may be embedded in one eyeglass arm connectable to the DSP 54 embedded in the same arm. In addition, two of the four microphones embedded in the front of the eyeglass frame can be controlled by the same DSP 54. Another eyeglass arm can control six microphones in the other eyeglass frame plus two remaining microphones of the four microphones in front of the eyeglass frame. Information about the TDK ICS-41251microphone can be found on https://invensense.com/products/digital/ics-41351/

The ADAU1787 DSP circuit has beamforming capabilities which is disclosed in the link https://www.analog.com/en/products/adau1787.html#product-overview Analog devices supplies also a user application program facilitating beamforming via a graphical user interface. Such a graphical user interface is also available as an application program that may be installed in the mobile phone 56.

In addition, the ADAU1787 is a fully programmable DSP device, which enables support of different user selectable options defined in a user profile and/or different hearing aid modes as discussed above. Such change of functionality can also be initiated by specific gestures detectable by a gesture detection system which may also be part of an hearing aid system of the present invention, in Addition, programs executed in SoC system which is also part the hearing aid system of the present invention.

The controller 44 controlling respective digital functional system-blocks can be a circuit of the type denoted a SOC, (System On a Chip,) which is an integrated circuit comprising functional components of a computer system. The use of a SoC 44 makes it much simpler to develop software configuring the operational aspects of an eyeglass frame system of the present invention. The development and runtime can be done under the supervision of an operating system like Linux. Prior art has several examples of SOC systems that can be used in examples of embodiments of the present invention. In addition, device drivers for different devices are available for Linux implementations.

A video system with a video camera 15 providing face detection capabilities can for example be the B5T-007001. Refer the link https://omronfs.omron.com/en US/ecb/products/pdf/en-b5t.pdf A video system 15 may comprise a camera 15a and a video SOC 15b configured to run the face detection algorithm discussed above.

A doppler shift radar system that can be used in embodiments of the present invention can for example be the Seeed doppler radar MW0582TR11. Refer the link https://www-.seeedstudio.com/MW0581TR11-5-8GHz-Microwave-Doppler-Radar-Motion-Sensor-p-4366.html.

FIG. 15 illustrates further that the system may comprise an accelerometer 51. A functional aspect of the accelerometer 51 is for example to detect touching of a finger on the eyeglass frame. It is known that such touching will generate noise picked up by the microphones and the system will generate sharp noise in the system. According to an example of embodiment of the present invention, accelerometer detections can result in a short muting of the microphones or any other suitable electronic part of the system. In some examples of embodiments, the eyeglass frame may be configured with some push buttons 41. Activations of such buttons 41 will result in a short muting stopping noise from the button action to reach ear buds 55 inserted into a wearer of the hearing aid system of the present invention.

The exemplary embodiment illustrated in FIG. 15 may also support gesture control. An example of a gesture system 48 that can be used is the gesture sensor PAJ7620U, which can recognize 9 different gestures. A gesture sensor can be positioned in the eyeglass frame 10 for example in the front of the eyeglass frame or in the eyeglass arms as disclosed in FIG. 3. Hand movements may then be detected resulting in detection of one specific gesture that may be associated with a specific command or action the SOC system 44 is configured to respond to.

In an example of embodiment of the present invention, the SoC system 44 is configured to transmit voice messages to ear bugs 55 inserted into the ears of the wearer of the eyeglass frame of the present invention. For example, a menu selection and instructions of how to proceed for example can be sent as a voice message.

With reference to the discussion above, the accelerometer will trigger muting of the audio stream whenever a finger is touching the eyeglass frame. When the touching is part of a menu selection gesture, the muting is over when the finger is lifted from the sensor surface.

The system illustrated in FIG. 15 may also comprise a gyroscope sensor 50. There are several known gyroscope sensors that may be used in examples of embodiments of the present invention.

In an example of embodiment of the present invention, the SOC system 44 is configured to identify a compass direction of the eyesight direction given by the gyroscope 50. The SOC system 44 is then configured to instruct the audio DSP 54 to perform beamforming in the compass direction ahead of the eyeglass frame 10. In this manner the beamforming is directed to the direction the wearer of the eyeglass frame 10 is looking.

The wireless communication system of an eyeglass frame 10 according to the present invention can follow for example a Blue tooth standard. With reference to FIG. 15, a Bluetooth antenna 45 is in communication with the SOC 44 via a RF filter section 46.

It is within the scope of the present invention that other communication standards may be used.

It is also within the scope of the present invention to use a communication standard comprising device addresses, i.e., a wireless signal from the eyeglass frame 10 may comprise a specific first address for an ear bud 55 inside the right-hand ear and a second specific address for an earbud 55 in the left-hand ear. Then different information can be sent to respective different ears. For example, if the microwave devices 14*a*, 11*a* on one of the eyeglass frames detects an approaching object on the right-hand side, the SOC 44 may be configures to send a warning to the earbud 55 located inside the right-hand ear of the wearer of the eyeglass frame. This can for example be a warning of an approaching car. For example, detecting the rate of change of the distance of the approaching object may be used to detect that a car is approaching and can trigger a warning of the approaching car.

A traffic radar or doppler shift radar 49 can also be embedded in an eyeglass frame according to the present invention.

The possible address mechanism may also stop wireless intercommunication between two eyeglass frames 10 that is used by two persons standing close to each other. This may stop misalignment of for example microphone beamforming in the respective eyeglass frames.

An aspect of the present invention is to use programs running in a SoC system to control beamforming lobes according to different hearing scenarios. Changing or selecting a specific hearing scenario can be made via gestured detected by a gesture controller 18 as illustrated in FIG. 3 or via a connected mobile phone as illustrated in FIG. 1. A beamforming lobe is defined by a direction relative to a microphone array surface, or for example the front side of the eyeglass frame since the front side of the eyeglass frame supports a microphone array. The same situation applies also to microphone arrays arranged on eyeglass arms. A combination of microphones on the front side of the eyeglass frame and microphones on the eyeglass frame is also possible. Any such microphone array will be faced towards a sound source of interest. A beamforming lobe direction towards the sound source can be user selected, for example when the user turns his head towards a sound source of interest and then select this as a beamforming lobe direction. The relative angular direction relative to the eyeglass frame surface can be read out from the gyroscope sensor when the gyroscope sensor is initialized with a relative angle of for example 0° when the eyeglass frame is facing straight forward.

There are at least two important factors that are relevant when calculating a beamforming lobe. One is of course the direction, but the beamforming lobe width is also important with respect to the filtering effect of a narrow beamforming lobe contrary to a wide beamforming lobe. Even if a beamforming lobe thereby is designed to pick up voice sound from a single person, this scenario may change for the wearer of the eyeglass frame as discussed above. The beam width direction can be associated with specific microphones inside the microphone lobe that is facing towards the sound source, and these microphones can be set with an increased amplification factor, for example in a pre-amplifier in a DSP circuit. The distance to a sound source can also help in defining a beamforming lobe width adapted to the perspective relative change of a sound source size relative to a distance change between the eyeglass frame and the sound source, Therefore, in general, a beamforming lobe direction is defined relative to a front side of a configured microphone array, a beamforming lobe width is defined based on a distance to the sound source, relative angular changes detected by the gyroscope sensor in the defined direction of the beam lobe triggers the SoC system to upload a change of parameters in the DSP modifying the beamforming width in accordance with the detected angular changes, or relative changes in the measured distance to the sound source detected by the distance measurement sensor triggers the SoC system to upload a change of parameters modifying the beamforming width in accordance with the detected distance changes.

It is to be noted that the system allows a user to freeze any settings identified by the system according to the rules defined above, and also activating again the system to actively provide optimized beamforming lobes according to a selected scenario. These actions can be done via gesture detection or via a connected mobile phone.

The invention claimed is:

1. A hearing aid system integrable in an eyeglass frame comprising at least one microphone array on a front side surface of the eyeglass frame, a distance measurement sensor, a gyroscope sensor, wherein a Digital Signal Processor (DSP) controlled by a configured System on a Chip (SoC) provides at least a beamforming lobe dependent on respective sensor output signals, wherein a beamforming lobe direction to a sound source is defined relative to the configured microphone array, wherein a beamforming lobe width is defined based on a distance to the sound source, wherein relative angular changes detected by the gyroscope sensor in the defined direction of the beam lobe triggers the SoC system to upload a change of parameters in the DSP modifying the beamforming width in accordance with the detected angular changes, or wherein relative changes in the measured distance to the sound source detected by the distance measurement sensor triggers the SoC system to upload a change of parameters modifying the beamforming width in accordance with a perspective increase or decrease of a size of a sound source when the distance to the sound source changes.

2. The system of claim 1, wherein a beamforming lobe direction is set by a user when looking in a direction of a sound source of interest to the user.

3. The system of claim 1, wherein the configured hearing aid system modifies a beam width of a defined beamforming lobe by moving one of respective side-curves of the beamforming lobe in a direction related to a gyroscope sensor detected first change of an eyeglass frame orientation.

4. The system of claim 3, wherein the configured hearing aid system modifies the beam width back to the beam forming lobe width originally set before the first change of the eyeglass frame orientation was detected when a second change of the eyeglass frame orientation is detected to be opposite the first detected change.

5. The system of claim 1, wherein respective detected relative distance changes correlates to a perspective increase or decrease of a contour size of a sound source the eyeglass frame is facing.

6. The system of claim 1, wherein the configured hearing aid system adjusts an amplification factor of at least one microphone, wherein the amplification factor adjustment up or down is proportional to an increase or decrease of a measured distance to a sound source.

7. The system of claim 1, wherein the configured hearing aid system to uses audible sound from a sound source the beamforming is pointing at to calculate a probability factor if the sound source is a human talking, a motor, a train or another type sound source.

8. The system of claim 1, wherein the eyeglass frame comprises a video camera embedded in the front of the eyeglass frame.

9. The system of claim 8, wherein a configured embedded video processor in communication with the video camera measures vertical and horizontal heights of a sound source contour the video processor has detected is facing the front of the eyeglass frame, wherein the vertical or horizontal height of the sound source is used when defining a beamforming lobe width.

10. The system of claim 9, wherein the configured embedded video processor detects a contour of a human face located in a field of view only if the contour image comprises at least two objects identified to be human eyes.

11. The system of claim 10, wherein the configured hearing aid system performs beam forming only if two human eyes are identified inside the detected contour of the human face and a measured distance to the detected human face is less than a defined distance.

12. The system of claim 9, wherein the video processor is configured to identify a number of human faces located in the field of view of the camera, wherein the SoC system configures a beamforming lobe covering the number of human faces that is identified.

13. The system of claim 9, wherein the configured embedded video processor provides face recognition of a set of different persons based on downloaded pictures of respective persons, wherein the system is configured to transmit a voice message to the wireless earbuds comprising the name of respective recognized persons.

14. The system of claim 1, wherein the plurality of microphones are digital omnidirectional microphones, and
   a first set of the plurality of digital omnidirectional microphones is arranged as a linear microphone array on a front part of the eyeglass frame, and/or
   a second set of the plurality of digital omnidirectional microphones is arranged as a linear microphone array on a right-hand eyeglass arm of the eyeglass frame, and/or
   a third set of the plurality of digital omnidirectional microphones is arranged as a linear microphone array on a left-hand eyeglass arm of the eyeglass frame,
   the hearing aid system is configured to provide beamforming based on respective microphone arrays formed by first set of omnidirectional microphones, and/or the second set of omnidirectional microphones, and/or the third set of omnidirectional microphones, or any other combination of omnidirectional microphones from the first, second and third set of omnidirectional microphones.

15. The system of claim 14, wherein beamforming based on respective microphone arrays from the first set of microphones, the second set of microphones and the third set of microphones are defined independently of each other.

16. The system of claim 15, wherein at least some microphones from at least two of the set of microphones is used to form one microphone array.

17. The system of claim 14, wherein the first, second and third set of omnidirectional microphones are arranged as Broadside Arrays.

18. The system of claim 14, wherein omnidirectional microphones from the first set of omnidirectional microphones is combined with a selected number of omnidirectional microphones from the second set and/or the third set of omnidirectional microphones, and the microphones are configured as an Endfire Array.

19. The system of claim 1, wherein at least one arm of the eyeglass frame comprises a gesture detection sensor.

20. The system of claim 1, wherein a set of precalculated beamforming lobes are stored in the SoC system and parameter settings defining a respective one of the precalculated beamforming lobes are downloaded to the DSP under control of the configured SOC system.

21. The system of claim 1, wherein the hearing aid system is configured to transmit pre-recorded voice messages to insertable earbuds providing information and/or instructions to the wearer of the eyeglass frame.

* * * * *